(12) United States Patent
Casari et al.

(10) Patent No.: US 10,718,660 B2
(45) Date of Patent: Jul. 21, 2020

(54) CLOSURE DETECTION SYSTEM

(71) Applicant: Robert Bosch GmbH, Stuttgart (DE)

(72) Inventors: John P. Casari, Manchester, MI (US); Guzman Emmanuel Alfonso Escalante, San Luis Potosi (MX); Noyola Luis Daniel Ibarra, San Luis Potosi (MX)

(73) Assignee: Robert Bosch GmbH, Stuttgart (DE)

( * ) Notice: Subject to any disclaimer, the term of this patent is extended or adjusted under 35 U.S.C. 154(b) by 411 days.

(21) Appl. No.: 15/621,747

(22) Filed: Jun. 13, 2017

(65) Prior Publication Data

US 2018/0356281 A1 Dec. 13, 2018

(51) Int. Cl.
*G01H 17/00* (2006.01)
*F16B 1/00* (2006.01)
*G01H 3/00* (2006.01)

(52) U.S. Cl.
CPC ............... *G01H 17/00* (2013.01); *F16B 1/00* (2013.01); *G01H 3/00* (2013.01); *F16B 2001/0092* (2013.01)

(58) Field of Classification Search
CPC ............... F16B 1/00; F16B 2001/0092; F16B 2001/0064; G01H 3/00; G01H 3/10; G01H 17/00
See application file for complete search history.

(56) References Cited

U.S. PATENT DOCUMENTS

| | | |
|---|---|---|
| 3,699,438 A | 10/1972 | Webb |
| 4,723,275 A | 2/1988 | Hirth et al. |
| 5,069,524 A * | 12/1991 | Watanabe ............... B25J 15/04 250/227.11 |
| 5,268,644 A | 12/1993 | Klassen et al. |
| 5,670,884 A | 9/1997 | Kodama |
| 5,779,279 A | 7/1998 | Bartholomew |
| 6,072,594 A | 6/2000 | Fujimoto |
| 6,223,821 B1 | 5/2001 | Coronado |
| 7,035,422 B1 * | 4/2006 | Wiener ............... H04R 1/025 381/301 |
| 8,186,216 B2 | 5/2012 | Ogawa et al. |

(Continued)

FOREIGN PATENT DOCUMENTS

DE 102012004165 A1 9/2013

*Primary Examiner* — Gregory J Toatley, Jr.
*Assistant Examiner* — Lynda Dinh
(74) *Attorney, Agent, or Firm* — Michael Best & Friedrich LLP

(57) ABSTRACT

A system and method for verifying a connection between a first and second connector. The system includes a transducer and a processor. The processor is configured to determine a velocity of the first connector when the first connector is moved to the second connector to form a coupling, calculate a time interval to the coupling based on the velocity detected at the set point and a position of the second connector, and receive, from the transducer, a signal during the time interval. The signal includes the sound generated when the coupling is formed. The processor analyzes the signal and identifies the sound of the coupling within the signal. The signal is filtered in the frequency domain and in the time domain, resulting in a filtered spectrogram. The spectrogram is compared to a pattern. The processor determines if the first and second connector are properly coupled based on the comparison.

20 Claims, 6 Drawing Sheets

(56) References Cited

U.S. PATENT DOCUMENTS

| | | |
|---|---|---|
| 8,556,651 B1 | 10/2013 | Heitmann et al. |
| 8,981,961 B2 | 3/2015 | Benner et al. |
| 9,491,557 B2 | 11/2016 | Fry et al. |
| 2004/0183295 A1 | 9/2004 | Kashara et al. |
| 2004/0183296 A1 | 9/2004 | Inoue et al. |
| 2011/0320202 A1* | 12/2011 | Kaufman ............... G10L 17/04 704/251 |
| 2014/0203945 A1 | 7/2014 | Benner et al. |
| 2016/0178682 A1 | 6/2016 | Eldridge et al. |
| 2016/0249147 A1* | 8/2016 | Maalouf ............ H04R 29/005 |
| 2017/0102424 A1 | 4/2017 | Maalouf et al. |

* cited by examiner

CLOSURE DETECTION SYSTEM

BACKGROUND

When making connections between components, whether those components are electrical, mechanical, or hydraulic, it is often important to ensure that the connection is complete or otherwise correctly made. An existing technique to verify a complete and correct connection is a visual inspection. In some circumstances, multiple visual inspections are performed.

BRIEF SUMMARY OF THE INVENTION

One embodiment provides a system for verifying a connection between a first and a second connector. The system includes an audio transducer and an electronic processor. The electronic processor is communicatively coupled to the audio transducer. The electronic processor is configured to determine a velocity of the first connector when the first connector passes a set point when the first connector is moved to the second connector to form a coupling. The coupling generates a sound. The electronic processor calculates a time interval to formation of the coupling based on the velocity detected at the set point and a position of the second connector. The electronic processor receives, from the audio transducer, an audio signal during the time interval. The audio signal includes the sound generated when the coupling is formed. The electronic processor generates and analyzes the audio signal and identifies the sound of the coupling within the audio signal. The audio signal is filtered a first time in the frequency domain and a second time in the time domain, resulting in a filtered spectrogram. The filtered spectrogram is compared to a predetermined sound pattern to generate a comparison. The electronic processor then determines if the first connector and the second connector are properly coupled based on the comparison.

Another embodiment provides a method for verifying a connection between a first connector and a second connector. The method includes moving the first connector to the second connector to form a coupling between the first connector and the second connector. The coupling generates a sound. The method further includes determining a velocity of the first connector when the first connector passes a set point. A time interval to formation of the coupling, based on the velocity detected at the set point and a position of the second connector, is determined. During the time interval, an audio signal including the sound generated when the coupling is formed is recorded. The audio signal is analyzed and the sound of the coupling is identified from the audio signal. The audio signal is filtered a first time in the frequency domain and then a second time in the time domain. The filtering results in or generates a filtered audio signal. A comparison of the filtered audio signal to a predetermined sound pattern is generated and is used to determine if the first connector and the second connector were properly coupled.

BRIEF DESCRIPTION OF THE DRAWINGS

FIG. 3B illustrates an initial filtered spectrogram of the original spectrogram of FIG. 3a.

FIG. 3C illustrates a final filtered spectrogram of the original spectrogram of FIG. 3a.

FIG. 3D illustrates a final filtered spectrogram of the original spectrogram of FIG. 3a.

DETAILED DESCRIPTION

Figure 1:
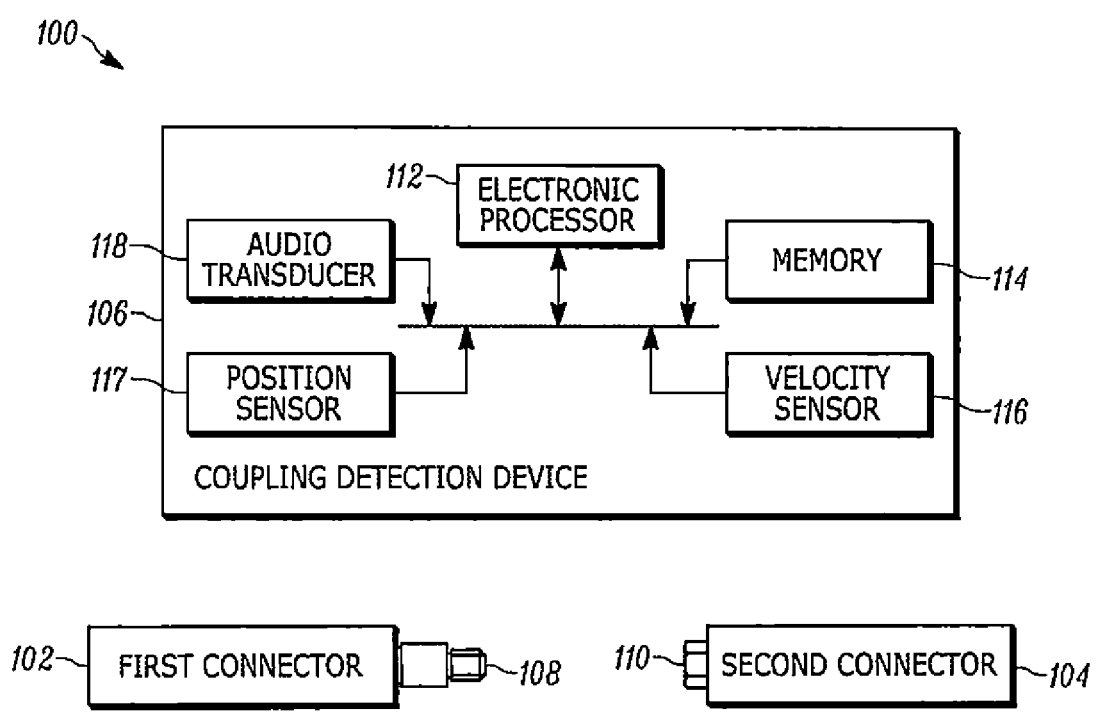
FIG. 1 schematically illustrates a coupling detection system.

Although visual inspections may be used to verify connections between components such inspection are not always completely accurate. In addition, it may not be possible to perform a visual inspection when components are in crowded spaces, in confined housings or spaces, or when a line of sight to the components is obstructed.

In some cases connection assurance may be achieved using a secondary mechanical locking mechanism. However, these locking mechanisms may be expensive additions to the connector system and are time consuming to assemble and lock during manufacturing.

For example, in the situation of the electrical connection between a harness connector and a fuel injector of a vehicle, the connection includes an elastomeric snap retainer. Typically, the verification of the connection is provided visually by an operator watching for the snap to be engaged. There may also be a secondary locking tab with a color contrast to the connector that the operator must engage as well. However, incomplete or low quality connections still occur, which may cause failed assemblies.

The inherent material properties of the connectors and physics of the connection produce, during the coupling, a frequency and energy creating a unique sound. By analyzing the unique sound produced, one can verify a proper connection.

As a consequence, one embodiment provides a system for verifying a connection between a first and a second connector. The system includes an audio transducer and an electronic processor. The electronic processor is communicatively coupled to the audio transducer. The electronic processor is configured to determine a velocity of the first connector when the first connector passes a set point when the first connector is moved to the second connector to form a coupling. The coupling generates a sound. The electronic processor calculates a time interval to formation of the coupling based on the velocity detected at the set point and a position of the second connector. The electronic processor receives, from the audio transducer, an audio signal during the time interval. The audio signal includes the sound generated when the coupling is formed. The electronic processor generates and analyzes the audio signal and identifies the sound of the coupling within the audio signal. The audio signal is filtered a first time in the frequency domain and a second time in the time domain, resulting in a filtered spectrogram. The filtered spectrogram is compared to a predetermined sound pattern to generate a comparison. The electronic processor then determines if the first connector and the second connector are properly coupled based on the comparison.

Another embodiment provides a method for verifying a connection between a first connector and a second connector. The method includes moving the first connector to the second connector to form a coupling between the first connector and the second connector. The coupling generates a sound. The method further includes determining a velocity of the first connector when the first connector passes a set point. A time interval to formation of the coupling, based on the velocity detected at the set point and a position of the second connector, is determined. During the time interval, an audio signal including the sound generated when the coupling is formed is recorded. The audio signal is analyzed and the sound of the coupling is identified from the audio signal. The audio signal is filtered a first time in the frequency domain and then a second time in the time domain. The filtering results in or generates a filtered audio signal. A comparison of the filtered audio signal to a predetermined sound pattern is generated and is used to determine if the first connector and the second connector were properly coupled.

Other aspects of these and other embodiments will become apparent by consideration of the detailed description and accompanying drawings.

Before any embodiments are explained in detail, it is to be understood that they are not limited in their application to the details of construction and the arrangement of components set forth in the following description or illustrated in the following drawings. The embodiments described are capable of being practiced or of being carried out in various ways and other embodiments are possible.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. The term "predetermined" means specified prior to an event. Also, electronic communications and notifications may be performed using any known means including direct connections (for example, wired or optical), wireless connections, or other communication.

It should also be noted that a plurality of hardware and software based devices, as well as a plurality of different structural components may be utilized to implement embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects may be implemented in software (for example, stored on non-transitory computer-readable medium) executable by one or more processors. As such, it should be noted that a plurality of hardware and software based devices, as well as a plurality of different structural components may be utilized to implement various embodiments.

FIG. 1 schematically illustrates a coupling detection system 100. In the example illustrated, the coupling detection system 100 includes a first connector 102, a second connector 104, and a coupling detection device 106.

The first connector 102 includes a first coupling end 108 and the second connector 104 includes a second coupling end 110. The first coupling end 108 and the second coupling end 110 are configured to be connectable to each other. The kind of connection between the first coupling end 108 and the second coupling end 110 is such that, upon connection, or coupling, of the two, a sound (or a series of sounds) is generated. In some embodiments, the sound is produced by the mechanics of the connection, for example, a "snap" or a "click." In other embodiments, the sound is electronically produced, such as a beep (or a series of beeps). The configuration of the first coupling end 108 and the second coupling end 110 to connect to each other may be, for example, via an interface fit with a locking device, a threaded fastening, a ratcheting fastening, a hasp closure, a magnetic closure, or a tumbler lock or another locking mechanism.

In the example shown, the coupling detection device 106 includes an electronic processor 112, a memory 114, a velocity sensor 116, a position sensor 117, and an audio transducer 118. The electronic processor 112 is communicatively coupled to the memory 114, the velocity sensor 116, the position sensor 117, and the audio transducer 118. The electronic processor 112 is configured to perform a coupling verification method described later in detail. Other types of electronic processors may be used including multiple processors connected in parallel, serial, or network configurations, processors that include or consist of application specific integrated circuits, as well as others.

In some embodiments, the velocity sensor 116 is an accelerometer. In other embodiments, the velocity sensor 116 may be a hall effect sensor, an optoelectronic sensor, or another suitable transducer sensor positioned to sense a velocity of the first connector 102.

The position sensor 117 is a sensor or sensors positioned to sense the location of one or both of the first connector 102 and the second connector 104. The electronic processor 112 receives signals from the position sensor 117, and determines from those signals the location of one or both of the first connector 102 and the second connector 104. In some embodiments, the position sensor 117 is an optical sensor (for example, an infrared or laser sensor). In some embodiments, the sensor 117 is an image capture system that analyzes video to determine the location. In some embodiments, the sensor 117 is a radar sensor.

The audio transducer 118 is positioned to and configured to detect the sound or series of sounds generated during the coupling of the first connector 102 to the second connector 104. In some embodiments, the audio transducer 118 is a directional transducer in line with the coupling to occur between the first connector 102 and the second connector 104. In some embodiments, the audio transducer 118 is located outside the coupling detection device 106. In some embodiments, the audio transducer or the coupling device 106 is mounted on or embedded in an article of clothing, for example, a glove, a shirt sleeve, or another suitable article of clothing worn by an operator performing the coupling of the first connector 102 to the second connector 104. The coupling device 106 may be attached to the article via sewing, clasps, adhesive, or other suitable fastening means. The coupling device 106 may be removably attached to the article, for example, using hook and loop fasteners, poppas and eyelets, snap fasteners, hook and eye fasteners, or another suitable means. In some embodiments, the coupling device 106 may be integrated into a wearable device, for example a bracelet or a smart watch. The audio transducer 118 or the coupling device 106 may also be mounted on or connected to a robotic end effector performing the coupling of the first connector 102 and the second connector 104. For example, the coupling device 106 may be mounted to an exterior surface of the robotic end effector so as not to hinder its operation. In such embodiments, the coupling device 106 is placed such that it is able to record the audio sound produced by the coupling despite background noise produced by the operation of the robotic end effector. In some embodiments, more than one audio transducer is used in combination. Some or all of the audio transducers may be stationary or mobile. In further embodiments, additional transducers are employed to collect surrogate sound pressure data.

Figure 2:
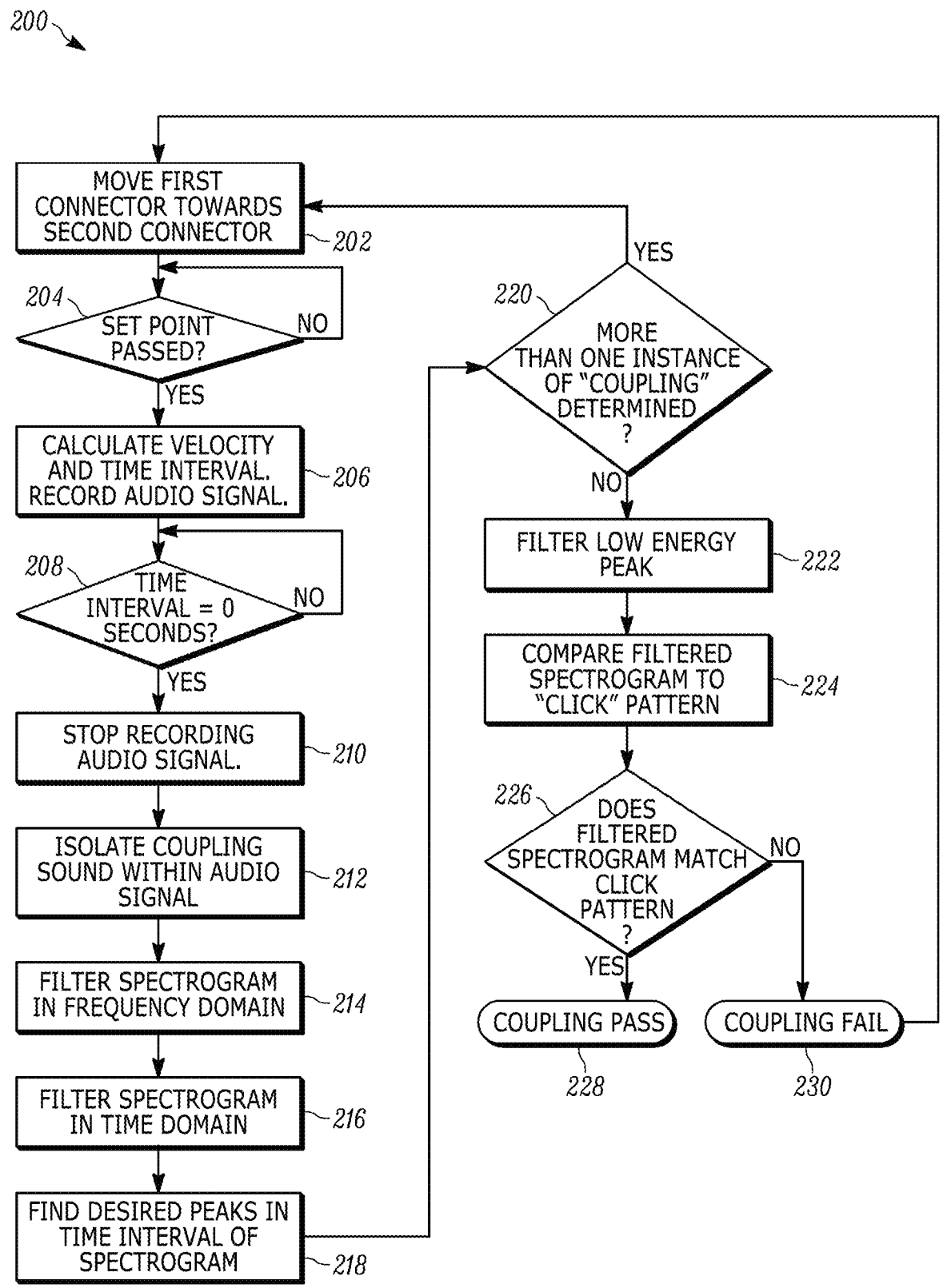
FIG. 2 schematically illustrates a method of verifying a connection implemented by the coupling detection system of FIG. 1.

In some embodiments, the system 100 also includes a position sensing assembly. The position sensing assembly is configured to FIG. 2 schematically illustrates a method 200 of verifying a connection between the first connector 102 and the second connector 104 of the coupling detection system 100. In the example illustrated, the method 200 begins when the first connector 102 is moved towards the second connector 104 to form a coupling of the first connector 102 to the second connector 104 (block 202). As the first connector 102 moves towards the second connector 104, the velocity sensor 116 senses when the first connector 102 moves past a set point (block 204). When the first connector 102 passes the set point at block 206, the coupling detection device 106 calculates, using data from the velocity sensor 116, the velocity of the first connector 102. Based on the calculated velocity, the coupling detection device 106 calculates a time interval to formation of the coupling between the first connector 102 and the second connector 104 and begins recording an audio signal using the audio transducer 118. In some embodiments, the velocity of the first connector 102 may be determined from control systems for a robotic end effector. In further embodiments, the velocity sensor 112 when the first connector 102 moves by sensing its location.

Figure 3A:
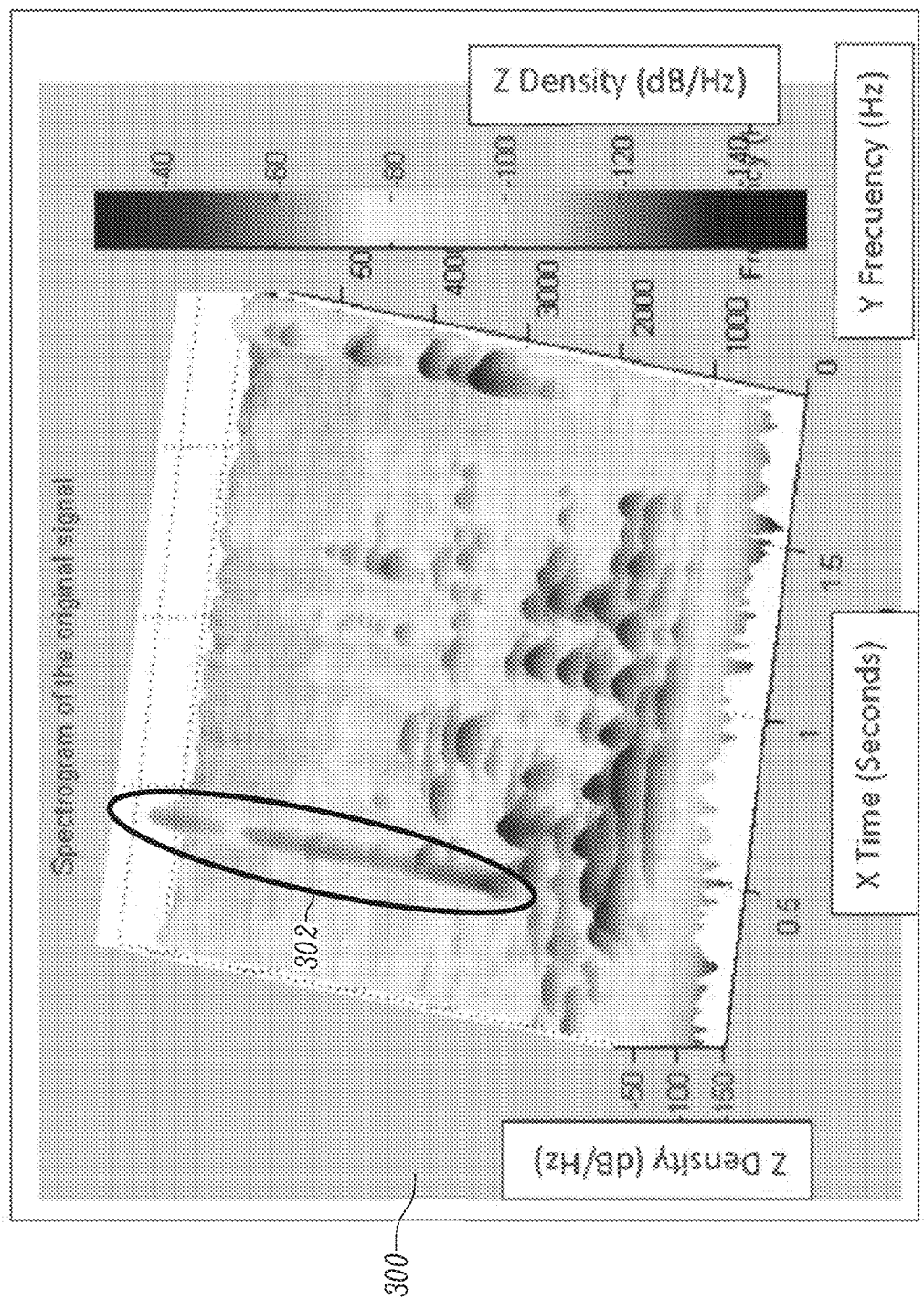
FIG. 3A illustrates an example spectrogram of an audio signal including a sound of a coupling.

At block 208, the recording of the audio signal continues for the duration of the calculated time interval. During the time interval, the first connector 102 is coupled to the second connector 104. The sound of the formation of the coupling is recorded within the audio signal. When the time interval ends, at block 210 the coupling detection device 106 stops recording audio. At block 212, the coupling detection device 106 isolates the sound of the formation of the coupling within the audio signal and removes the rest of the audio signal, creating a shorter audio signal. In some embodiments, a spectrogram is created from the shortened signal including the sound of the coupling over a time interval. FIG. 3A illustrates an example spectrogram 300 (in this case a three dimensional spectrogram) created via the steps in blocks 206-212. The spectrogram 300 illustrated depicts time in seconds on the x-axis, frequency in Hertz on the y-axis, and power spectral density in decibels per Hertz on the z-axis. The coupling event is located, as marked by a circle 302, in the area of the signal with significant power spectral density. Optionally, in some embodiments, the method 200 may be performed using the audio signal directly, without first producing a spectrogram or isolating the sound of the coupling within the audio signal.

Returning to FIG. 2, at block 214, certain desired peaks within the shortened audio signal of the spectrogram are identified near and encompassing the coupling event. These peaks discriminate the sound of the coupling from the rest (or median) of the data of the audio signal recorded over the time interval. The sound of the coupling has certain characteristics such as the amplitude of the signal, power in decibels, and frequencies generated by the impact of the coupling in a known period of time.

When there is too much noise interference affecting the collection of the signal and/or the identification of the characteristic peaks, then a notification to take action is generated to gather a normal, unobstructed signal. The notification may include an option to reset the recordings. In such a case, when the reset option is selected, the method restarts at block 202.

Figure 3B:
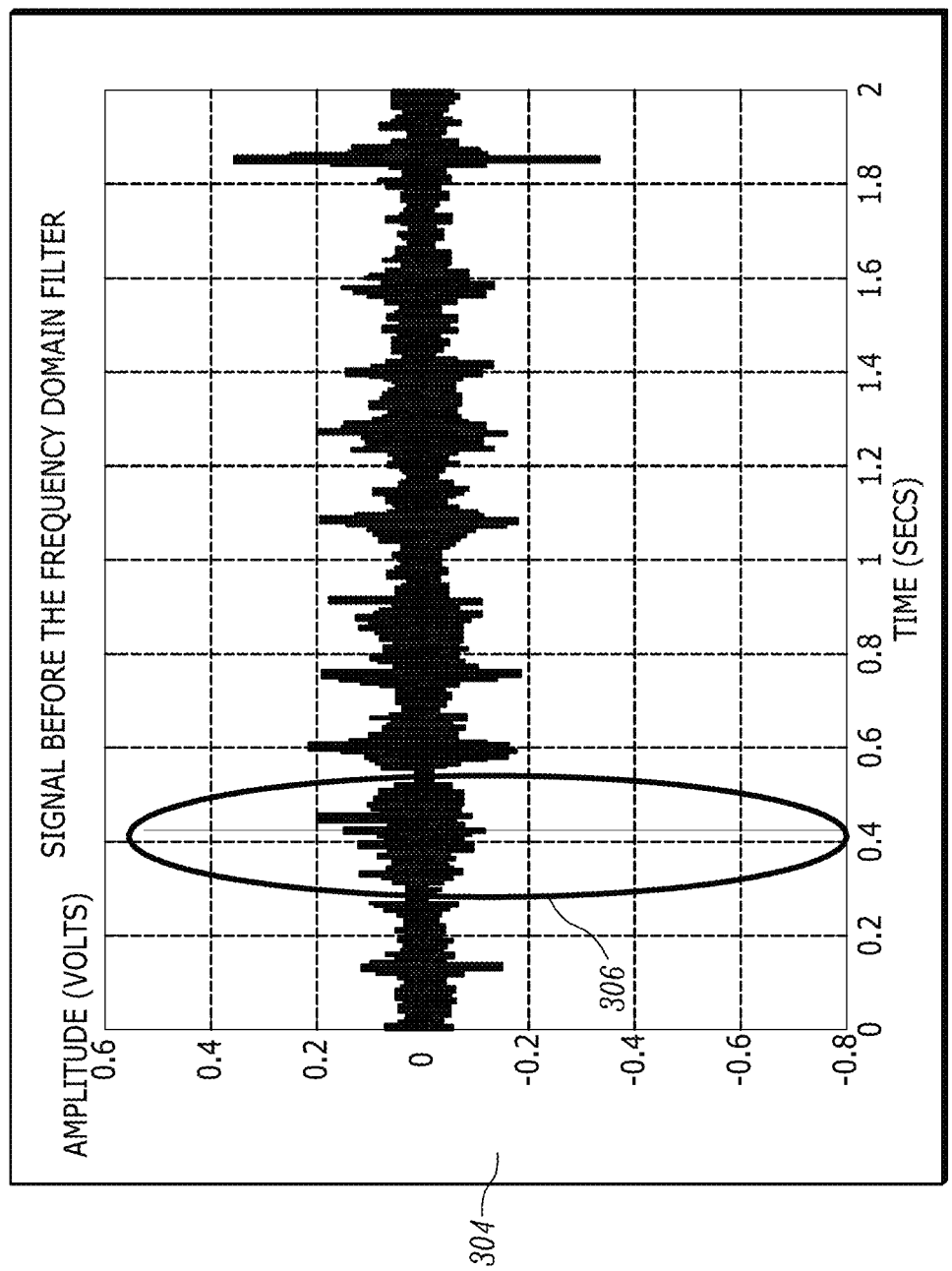

At block 216, the spectrogram of the shortened audio signal is filtered a first time in the frequency domain, generating an initial filtered spectrogram. More specifically, the shortened audio signal is passed into the frequency domain and is assigned a maximum amplitude limitation. The frequencies that exceed the maximum amplitude limitation are each multiplied by a filtering factor to decrease their amplitude. This filtering directly affects the spectrogram of the audio signal in the time domain and filters the audio signal itself, reducing unwanted signal scope. Since the spectrogram undergoes filtering, the audio signal itself is affected by the filtering. When the spectrogram is of the shortened audio signal, the filtering results in an initially filtered shortened audio signal. Likewise, when the spectrogram is of the audio signal (without isolation of the coupling sound), the filtering results in an initially filtered audio signal. FIG. 3B illustrates the spectrogram 300 of FIG. 3A after the initial filtering in the frequency domain, creating a initially filtered spectrogram 304. The initial filtered spectrogram 304 illustrated depicts time in seconds on the x-axis and amplitude in volts on the y-axis. The coupling event located within the initial filtered spectrogram 306 is marked by a circle 306.

Returning to FIG. 2, at block 218, the initial filtered spectrogram is filtered in the time domain, generating a fully filtered spectrogram. The filtering in the time domain involves assigning a maximum amplitude limitation and minimum amplitude limitation. Each value of the audio signal that exceeds either limit is multiplied by a filtering factor to decrease them. This filtering in the time domain directly affects the frequency domain. Again, since the spectrogram undergoes filtering, the audio signal itself is affected by the filtering. When the spectrogram is of the shortened audio signal, the filtering results in a final filtered shortened audio signal. Likewise, when the spectrogram is of the audio signal (without isolation of the coupling sound), the filtering results in a final filtered audio signal. The purpose of the order of the filters is because a peculiarity of the desired coupling event signal is that it has a certain number of values in frequency, which cannot be filtered only from the time domain. This could generate interference similar to the desired coupling event signal in the frequency domain characteristics.

Returning to FIG. 2, at block 220, the characteristic peaks (indicative of the coupling event) in the fully filtered spectrum are located. First, another maximum amplitude limitation and another minimum amplitude limitation are applied to the fully filtered spectrogram. The peak within the fully filtered spectrum that exceeds the maximum amplitude limitation (the highest peak) is identified. The peak that exceeds the minimum amplitude limitation (the lowest peak) is also identified. The pattern of the coupling event must have a certain predetermined width (time) between the maximum and minimum amplitude (the highest peak and the lowest peak) located in the spectrogram. The time interval between the highest peak and the lowest peak is calculated and the signals outside the desired characteristic peaks are removed, creating a final filtered spectrogram (at block 222). If there is more than one peak matches either amplitude limitation, the analysis is stopped and an option to restart may be provided. When the restart is selected, the method 200 starts again at block 202.

Figure 3C:
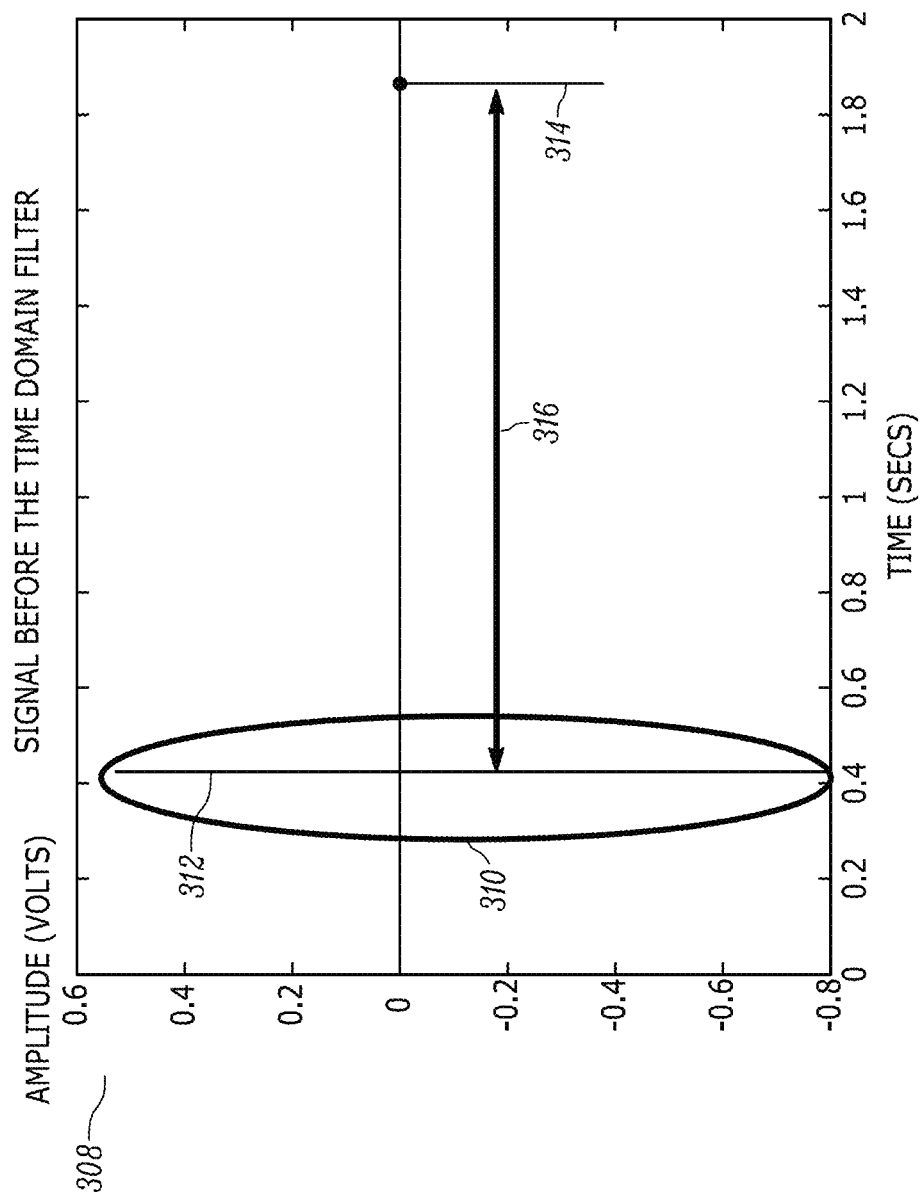
Figure 3D:
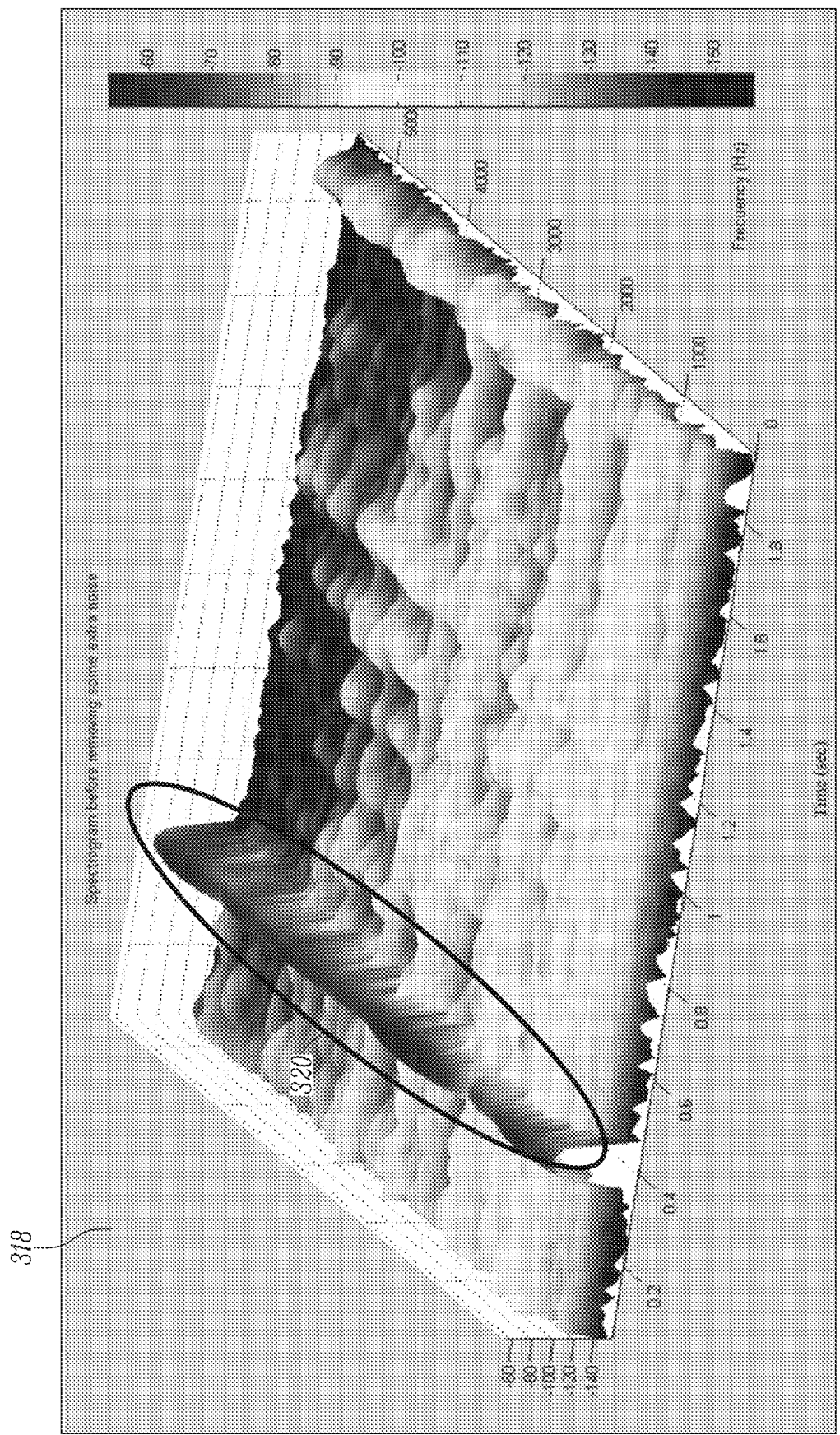

FIG. 3C illustrates the initially filtered spectrogram 304 of FIG. 3B after being filtered in the time domain and with the parts of the signal outside the desired characteristic peaks removed creating a final filtered spectrogram 308. The final filtered spectrogram 308 illustrated depicts time in seconds on the x-axis and amplitude in volts on the y-axis. The coupling event located within the final filtered spectrogram 308 is marked by a circle 310. As described in regards to blocks 220 and 222, a highest peak 312 and a lowest peak 314 of the fully filtered spectrogram is located and a time interval 316 between them is calculated. The parts of the signal outside the highest peak 312 and the lowest peak 314 are removed to isolate the coupling event. FIG. 3D illustrates a 3-D spectrogram 318 of the final filtered spectrogram 308 of FIG. 3C. The coupling event is marked by a circle 320. As compared to the coupling event within FIG. 3A, the coupling event within spectrogram 318 is clearer and easily identifiable from the rest of the signal.

Returning to FIG. 2, at block 224, the final filtered spectrogram is compared to a predetermined spectrogram. In some embodiments, the predetermined spectrogram is that of the original spectrogram before any filtering (spectrogram at block 214) to verify that the time interval between the highest and lowest peak is the same. The predetermined spectrogram may also be a spectrogram from a previous coupling event or a calculated ideal spectrogram. When the time intervals match, than the time intervals of the original spectrogram and the final filtered spectrogram are each compared to the time interval calculated by the filter at block 222. The time intervals of the original and the final spectrograms are also compared to each other. If the time interval of the final spectrogram matches within a tolerance of the time interval of the original spectrogram, the coupling is determined to be successful (block 228). However, when the time interval of the final spectrogram does not match or cannot be determined, the coupling is determined to be unsuccessful (block 230). When it is determined that the coupling was unsuccessful, an option to restart is provided. When the restart is selected, the method begins again at block 202.

In some embodiments, it is the final filtered shortened audio signal that is compared to a predetermined sound pattern. The predetermined sound pattern may be the audio signal or the shortened audio signal before filtering. In some embodiments, the predetermined sound pattern may also be an audio signal from a previous coupling event or a calculated ideal audio signal. The time interval between the highest and lowest peaks of the final filtered audio signal are compared to the time interval between the highest and lowest peaks of the predetermined sound pattern. Each of the time intervals of the final filtered signal and the predetermined sound pattern are compared to the time interval calculated by the filter at block 222. As described above in regards to block 228, when the time intervals match the coupling is determined to be successful. Otherwise, at block 230, when the time intervals do not match, the coupling is determined to be unsuccessful.

In some embodiments, for example, when assembling a vehicle, many couplings are made. In such embodiments, the electronic processor 112 determines a location for the coupling being made for example, using signals received from the position sensor 117. The electronic processor 112 assigns an identifier to the coupling based on the location. By repeating this process, the electronic processor 112 can ensure that all required couplings have been completed.

Thus, the invention provides, among other things, a system and method for verifying a connection. Various features and advantages of the invention are set forth in the following claims.

What is claimed is:

1. A system for verifying a connection, the system comprising:
  an audio transducer; and
  an electronic processor communicatively coupled to the audio transducer and configured to:
    determine a velocity of a first connector when the first connector passes a set point when the first connector is moved to a second connector to form a coupling, the coupling generating a sound;
    calculate a time interval to formation of the coupling, the time interval based on the velocity detected at the set point and a position of the second connector;
    receive, from the audio transducer, an audio signal during the time interval, the audio signal including the sound generated when the coupling is formed;
    filter the audio signal a first time in a frequency domain;
    filter the audio signal a second time in a time domain, the filtering resulting in a filtered audio signal;
    compare the filtered audio signal to a predetermined sound pattern to generate a comparison; and
    determine if the first connector and the second connector are properly coupled based on the comparison.

2. The system of claim 1, wherein the electronic processor is further configured to
  create a spectrogram from the audio signal, and
  generate a comparison between a filtered spectrogram to a predetermined spectrogram and wherein filtering the audio signal the first time in the frequency domain includes filtering the spectrogram, and filtering the audio signal the second time in the time domain includes filtering the spectrogram, resulting in the filtered spectrogram.

3. The system of claim 2, wherein the predetermined sound pattern is the spectrogram before filtering, a spectrogram from a previous coupling event, or a calculated ideal spectrogram.

4. The system of claim 1, wherein the predetermined sound pattern is the audio signal before filtering, an audio signal from a previous coupling event, or a calculated ideal audio signal.

5. The system of claim 1, wherein the comparison involves comparing a time interval of the coupling within the time interval to a time interval of a second coupling within the predetermined sound pattern.

6. The system of claim 1, wherein the coupling is an interface fit with a locking device, a threaded fastening, a ratcheting fastening, a hasp closure, a magnetic closure, a tumbler lock, or a locking mechanism.

7. The system of claim 1, wherein the system is configured to be mounted on or connected to an article of clothing.

8. The system of claim 1, wherein the system is configured to be mounted on or connected to a robotic end effector.

9. The system of claim 1, wherein the audio transducer is a directional transducer in line with the coupling to occur between the first connector and the second connector.

10. The system of claim 1, further comprising at least one additional transducer configured to collect surrogate sound pressure data.

11. The system of claim 1 wherein the electronic processor is further configured to
  identify the sound of the coupling within the audio signal, and
  isolate the sound of the coupling within the audio signal and remove the rest of the audio signal, creating a shortened audio signal and wherein filtering the audio signal the first time in the frequency domain includes filtering the shortened audio signal, resulting in a first filtered shortened audio signal and filtering the first filtered audio signal the second time in the time domain includes filtering the first filtered shortened audio signal, resulting in a second filtered shortened audio signal.

12. The system of claim 1, wherein the electronic processor is further configured to:
determine a location of the coupling; and
assign an identifier to the coupling based on the location.

13. A method for verifying a connection between a first connector and a second connector, the method comprising:
moving the first connector to the second connector to form a coupling between the first connector and the second connector, the coupling generating a sound;
determining, based on a signal from a sensor assembly, a velocity of the first connector when the first connector passes a set point;
determining a time interval to formation of the coupling, the time interval based on the velocity detected at the set point and a position of the second connector;
recording, during the time interval, an audio signal including the sound generated when the coupling is formed;
filtering the audio signal a first time in a frequency domain, resulting in a first filtered audio signal;
filtering the first filtered audio signal a second time in a time domain, resulting in a second filtered audio signal;
generating a comparison of the second filtered audio signal to a predetermined sound pattern; and
determining if the first connector and the second connector were properly coupled based on the comparison.

14. The method of claim 13 further comprising:
creating a spectrogram from the audio signal; and
generating a comparison between a second filtered spectrogram to a predetermined spectrogram;
wherein filtering the audio signal the first time in the frequency domain includes filtering the spectrogram, resulting in a first filtered spectrogram and filtering the first filtered audio signal the second time in the time domain includes filtering the first filtered spectrogram, resulting in the second filtered spectrogram.

15. The method of claim 14, wherein the predetermined spectrogram is the spectrogram before filtering.

16. The method of claim 14, wherein the predetermined sound pattern is of the audio signal before filtering.

17. The method of claim 14, wherein the comparison involves comparing a time interval of the coupling within the time interval to a time interval of a second coupling within the predetermined sound pattern.

18. The method of claim 13 further comprising:
identifying the sound of the coupling within the audio signal;
isolating the sound of the coupling within the audio signal and removing the rest of the audio signal, creating a shortened audio signal
wherein filtering the audio signal the first time in the frequency domain includes filtering the shortened audio signal, resulting in a first filtered shortened audio signal and filtering the first filtered audio signal the second time in the time domain includes filtering the first filtered shortened audio signal, resulting in a second filtered shortened audio signal.

19. The method of claim 13, wherein the coupling is an interface fit with a locking device, a threaded fastening, a ratcheting fastening, a hasp closure, a magnetic closure, a tumbler lock, or a locking mechanism.

20. The method of claim 13, further comprising:
determining a location of the coupling; and
assigning an identifier to the coupling based on the location.

* * * * *